(12) United States Patent
Yang

(10) Patent No.: US 7,050,310 B2
(45) Date of Patent: May 23, 2006

(54) SYNCHRONOUS RECTIFICATION CIRCUIT WITH DEAD TIME REGULATION

(75) Inventor: Hui Chiang Yang, Hsintien (TW)

(73) Assignee: Niko Semiconductor Co., Ltd., Taipei (TW)

( * ) Notice: Subject to any disclaimer, the term of this patent is extended or adjusted under 35 U.S.C. 154(b) by 93 days.

(21) Appl. No.: 10/774,479

(22) Filed: Feb. 10, 2004

(65) Prior Publication Data

US 2005/0174819 A1    Aug. 11, 2005

(51) Int. Cl.
*H02M 3/335* (2006.01)
(52) U.S. Cl. .............................. 363/21.06; 363/21.14; 363/127
(58) Field of Classification Search ................. 363/16, 363/17, 21.06, 21.14, 37, 52, 53, 89, 90, 363/125, 127
See application file for complete search history.

(56) References Cited

U.S. PATENT DOCUMENTS

| | | | | |
|---|---|---|---|---|
| 5,726,869 A | * | 3/1998 | Yamashita et al. | ........ 363/21.06 |
| 6,650,552 B1 | * | 11/2003 | Takagi et al. | .................. 363/17 |
| 6,879,499 B1 | * | 4/2005 | Matsumoto | .............. 363/21.06 |
| 6,888,728 B1 | * | 5/2005 | Takagi et al. | .................. 363/17 |

* cited by examiner

*Primary Examiner*—Jessica Han
(74) *Attorney, Agent, or Firm*—Rosenberg, Klein & Lee

(57) ABSTRACT

A synchronous rectification circuit with dead time regulation being adapted for a forward power supply to regulate a dead time of a switch circuit is described. The synchronous rectification circuit has a first switch control circuit connected with a first switch to control ON/OFF of the first switch, a dead time regulation circuit connected with the first switch control circuit to produce a dead time regulation signal, and a second switch control circuit connected with a second switch and the dead time regulation circuit to control ON/OFF of the second switch.

9 Claims, 5 Drawing Sheets

SYNCHRONOUS RECTIFICATION CIRCUIT WITH DEAD TIME REGULATION

BACKGROUND OF THE INVENTION

1. Field of the Invention

The present invention relates to a synchronous rectification circuit with dead time regulation and, in particular, to a synchronous rectification circuit with dead time regulation using forward power supply.

2. Description of the Related Art

In order to minimize the size of a transformer in a known DC power supply apparatus, such as an AC to DC switching power supply, high frequency pulse width modulation (PWM) is usually used for control of a DC output voltage. As shown in FIG. 1, a schematic circuit diagram of a forward power supply apparatus, which is separated by a transformer T1 into a primary front-end circuit 101 and a secondary back-end circuit 102, is shown. The back-end circuit 102 is composed of a first switch Q1, a second switch Q2, an inductor L and a capacitor C. Two terminals V1 and V2 on the secondary side of the transformer T1 are connected to gate terminals G1 and G2 of the first switch Q1 and the second switch Q2, respectively, for controlling the ON/OFF of the first switch Q1 and the second switch Q2, which in turn operate in combination with the energy-storage inductor L and the filtering capacitor C to produce a stable output DC voltage Vo.

With reference to FIG. 2, waveforms at various nodes in the circuit of the prior art forward power supply apparatus in FIG. 1 are schematically shown. In the drawing, the horizontal axis represents time t while the vertical axis represents voltage v. During the time interval t0–t1, the terminal V1 on the secondary side of the transformer T1 is HIGH and the terminal V2 is LOW, so the gate terminal G1 of the first switch Q1 connected to the terminal V1 is HIGH and the gate terminal G2 of the second switch Q2 connected to the terminal V2 is LOW. At this time, the first switch Q1 conducts and the second switch Q2 is cutoff.

During the time interval t1–t2, the terminal V1 becomes LOW and the terminal V2 becomes HIGH, so the gate terminal G1 of the first switch Q1 connected to the terminal V1 is LOW and the gate terminal G2 of the second switch Q2 connected to the terminal V2 is HIGH. At this time, the first switch Q1 is cutoff and the second switch Q2 conducts.

During the time interval t2–t3, the terminal V1 remains LOW and thus the first switch Q1 is still cutoff. However, at this time, the voltage at the terminal V2, which is connected to the gate terminal G2 of the second switch Q2, drops below a cutoff voltage VP allowing the second switch Q2 to conduct, driving the second switch Q2 into cutoff in advance. Now the circuit enters into the dead time.

During the time interval t3–t4, the terminal V1 remains LOW and thus the first switch Q1 is still cutoff. Meanwhile, the terminal V2 drops to LOW. Consequently, the second switch Q2 remains cutoff. At this time, the circuit is also in the dead time. In the above description, the first switch Q1 and the second switch Q2 are both MOSFETs.

In summary, the dead time in the circuit of the prior art forward power supply apparatus is t2–t4. Such a dead time varies with a conducting cycle at the terminal V1 on the secondary side of the transformer T1 and, more specifically, the shorter the conducting cycle at the terminal V1, the longer the dead time. Further, a shorter conducting cycle at the terminal V2 on the secondary side of the transformer T1 adversely affects the efficiency of the circuit.

Moreover, although the prior art forward power supply apparatus has a simple circuit structure, the output voltage level is very limited, usually to an output voltage of under 3.3V. The reason for this is that the voltage of the transformer is at least approximately 2.5–4 times the output voltage and the voltage on the secondary side of the transformer exceeds a withstand voltage of a gate-source voltage of a MOSFET switch in an application having an output voltage of 3.3V or more.

Furthermore, in the circuit of the prior art forward power supply apparatus, the second switch Q2 and the first switch Q1 will both conduct for a short period at the time when the conducting cycle of the second switch Q2 is about to terminate, resulting in a switching loss. This effect is especially significant when the output voltage is high.

SUMMARY OF THE INVENTION

In light of the above problems, the present invention provides a synchronous rectification circuit with dead time regulation, in which a dead time may be regulated and remains constant after regulation, so that the long dead time and the reduced efficiency resulting from the unstable voltage waveform on the secondary side of the transformer in the prior art circuit may be improved. Further, the invention is applicable to a circuit having a higher output voltage without adversely affecting the operation of the switches, while allowing minimization of the switching loss resulting from simultaneous conduction of both switches. Moreover, the synchronous rectification circuit with dead time regulation according to the present invention may be modulized into a single control IC reduce the manufacturing cost and the product size.

The synchronous rectification circuit with dead time regulation according to the present invention is adapted to a synchronous rectification circuit in a forward power supply. The circuit of the invention is connected to a secondary side of a transformer, a first switch, a second switch and an inductor and is provided with a first switch control circuit, a dead time regulation circuit and a second switch control circuit. The first switch control circuit includes a waveform shaping circuit and a first driver circuit. The waveform shaping circuit receives an input voltage from the secondary side of the transformer and shapes the waveform of the input voltage for the first driver circuit to control ON/OFF of the first switch.

Further, the dead time regulation circuit includes a pulse generator circuit, a voltage regulation circuit, a charging circuit and a first comparator circuit. A dead time regulation comparison signal is produced by means of the pulse generator circuit and the charging circuit; a dead time regulation signal is then generated through the first comparator circuit by using the dead time regulation comparison signal and a first reference voltage level and is sent to the second switch control circuit. The second switch control circuit includes an inverter circuit, a logic circuit and a second driver circuit. The inverter circuit receives the input voltage from the secondary side of the transformer and inverts the received signal to produce an inverted voltage, which is then sent to the logic circuit. The logic circuit receives both the dead time regulation signal from the dead time regulation circuit and the inverted voltage and performs a logic AND operation to control the second driver circuit and thus the ON/OFF of the second switch.

As described, in the synchronous rectification circuit with dead time regulation according to the present invention, the dead time of the switch circuit may be regulated by adjusting the resistance of the resistor R and/or the capacitance of the capacitor C in the charging circuit so that the circuit loss due to the long dead time and the switching loss due to the unstable dead time in the prior art are both minimized. Moreover, the switches are driven respectively by the first driver circuit and the second driver circuit, instead of directly by the voltage at the secondary side of the transformer, and thus the circuit may be applied when output voltage is high without adversely affecting the switches.

BRIEF DESCRIPTION OF THE DRAWINGS

Features and advantages of the present invention will be fully understood from the detailed description to follow taken in conjunction with the embodiments as illustrated in the accompanying drawings, which are to be considered in all respects as illustrative and not restrictive, wherein.

DETAILED DESCRIPTION OF PREFERRED EMBODIMENTS

Figure 1:
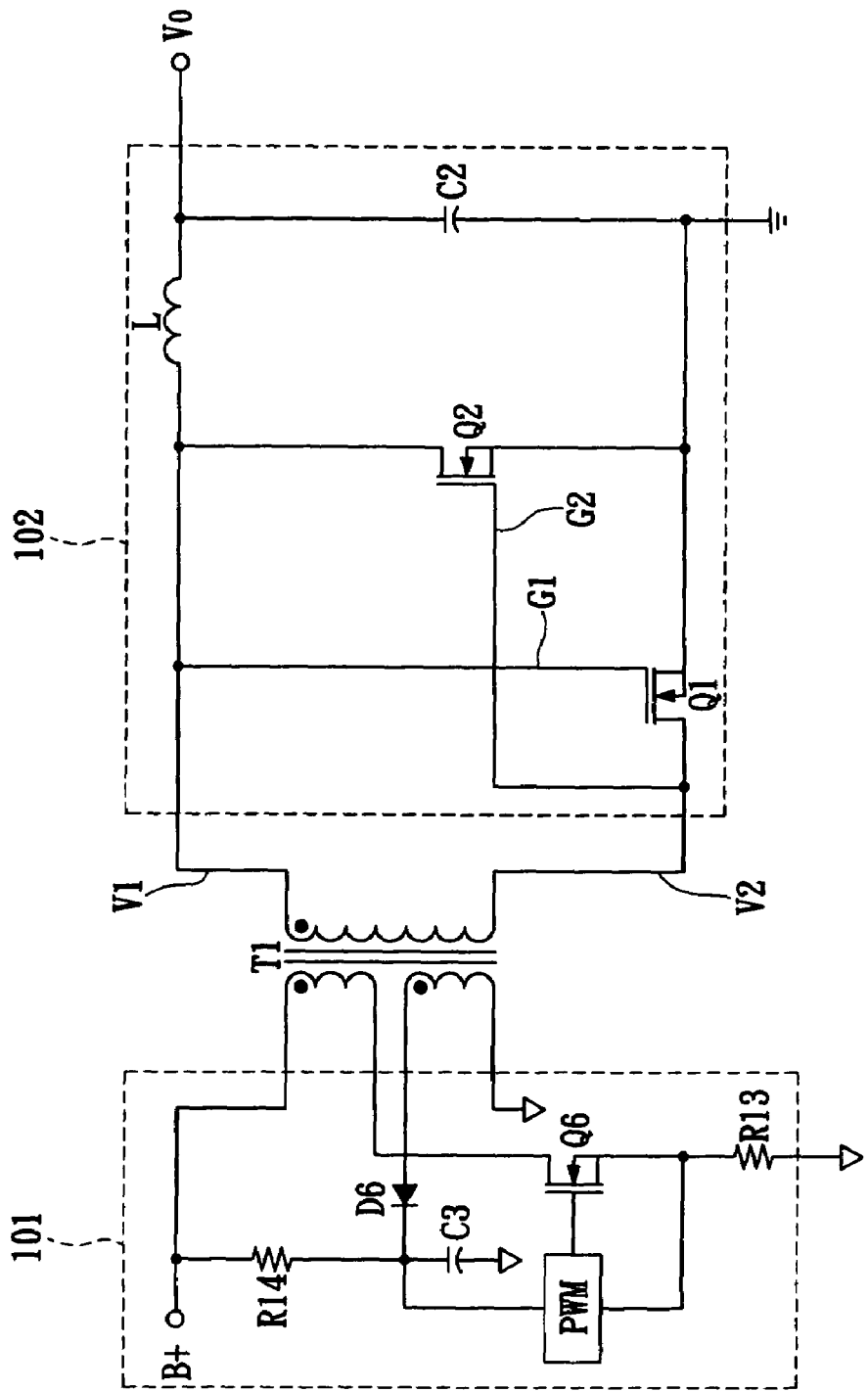
FIG. 1 depicts a schematic circuit diagram of a prior art forward power supply apparatus.
Figure 2:
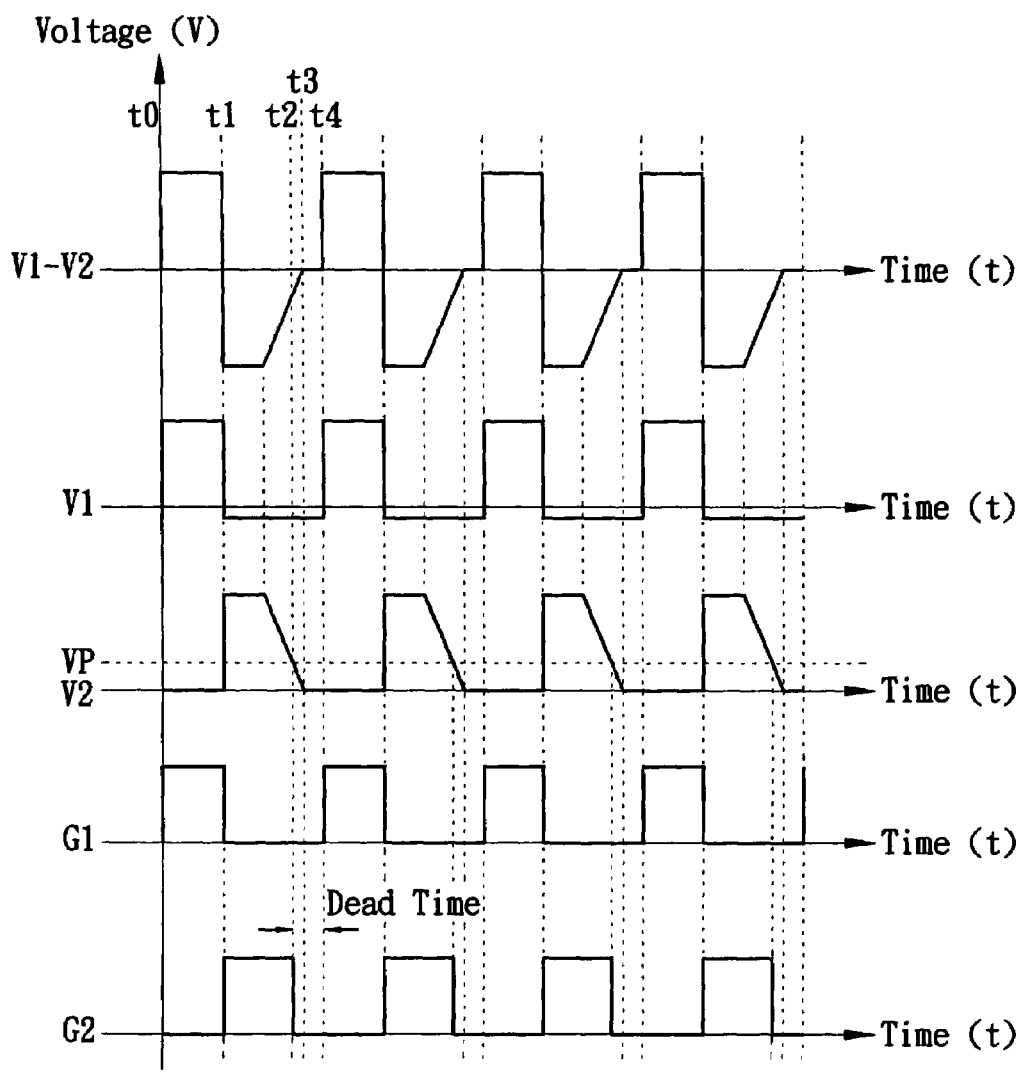
FIG. 2 schematically shows the waveforms at various nodes in the circuit of the prior art forward power supply apparatus.
Figure 3:
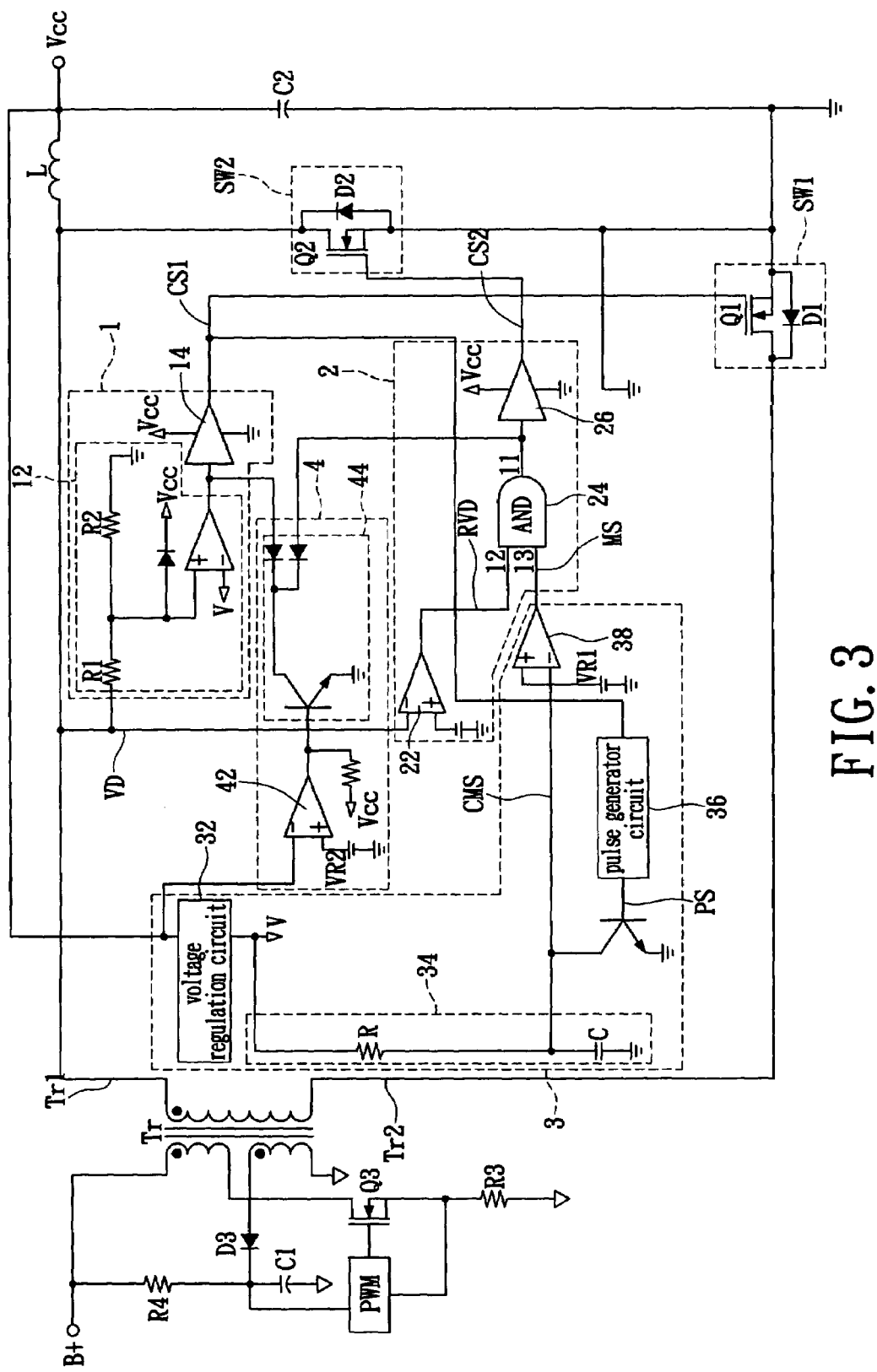
FIG. 3 depicts a schematic circuit diagram of the forward power supply apparatus according to the present invention.

Referring to FIG. 3, a schematic circuit diagram of the forward power supply apparatus according to the present invention is shown. The circuit of the invention is connected to a secondary side of a transformer Tr, an inductor L, a first switch SW1 and a second switch SW2 and outputs a DC power Vcc. The circuit comprises a first switch control circuit 1, a second switch control circuit 2, a dead time regulation circuit 3 and a low voltage protection circuit 4. Two terminals are provided on the secondary side of the transformer Tr.

Referring to FIG. 3, the first switch control circuit 1 is connected to one terminal Tr1 on the secondary side of the transformer Tr through a waveform shaping circuit 12, which receives an input voltage VD and shapes the waveform of the input voltage VD to produce a first driving voltage VD1. Meanwhile, the first driving voltage VD1 is used for controlling operation of a first driver circuit 14 connected with the waveform shaping circuit 12. The first driver circuit 14 in turn produces, based on the control of the first driving voltage VD1, a first control signal CS1 for turning ON/OFF the first switch SW1 connected to the first driver circuit 14.

Referring to FIG. 3, the dead time regulation circuit 3 is connected to the DC power Vcc through a voltage regulation circuit 32, which produces from the DC power Vcc a charging power for performing a charging operation in a charging circuit 34 connected with the voltage regulation circuit 32. The charging circuit 34 is an RC charging circuit. At this time, the dead time regulation circuit 3 is connected to the first switch control circuit 1 through a pulse generator circuit 36, which generates a pulse signal PS by using waveform rising-edge triggering based on the first control signal CS1 output from the first switch control circuit 1.

As described above, by means of the pulse signal PS generated from the pulse generator circuit 36 and the charging operation in the charging circuit 34, the dead time regulation circuit 3 produces a dead time regulation comparison signal CMS, which is, in this example, a sawtooth wave signal. Meanwhile, the dead time regulation comparison signal CMS is fed to an inverting input terminal (−) of a first comparator circuit 38, while a non-inverting input terminal (+) of the first comparator circuit 38 is connected to a first reference voltage level VR1 that is positive. Through the first comparator circuit 38, the dead time regulation circuit 3 compares the first reference voltage level VR1 with said dead time regulation comparison signal CMS and produces a dead time regulation signal MS to be sent to the second switch control circuit 2.

Referring to FIG. 3, the second switch control circuit 2 is connected to one terminal Tr1 on the secondary side of the transformer Tr through an inverter circuit 22, which receives the input voltage VD and inverts the received signal to produce an inverted voltage RVD. The inverted voltage RVD is sent to a logic circuit 24 connected with said inverter circuit 22. The logic circuit 24 performs a logic AND operation on the inverted voltage RVD and the dead time regulation signal MS to produce a second driving voltage VD2. Meanwhile, the second driving voltage VD2 controls the operation of a second driver circuit 26 connected with the logic circuit 24. The second driver circuit 26 in turn produces, based on the control of the second driving voltage VD2, a second control signal CS2 for turning ON/OFF the second switch SW2 connected to the second driver circuit 26.

Referring to FIG. 3, the low voltage protection circuit 4 is connected to the DC power Vcc at an inverting input terminal (−) of a second comparator circuit 42 and to a second reference voltage level VR2 at a non-inverting input terminal (+). The second comparator circuit 42 compares the DC power Vcc with the second reference voltage level VR2 and produces a protection control signal PCS which is then sent to an electronic switch circuit 44 connected with the second comparator circuit 42 so that the electronic switch circuit 44 may be controlled to ground the output voltages of the first switch control circuit 1 and the second switch control circuit 2 for low voltage protection. In the above description, the second reference voltage level VR2 is positive and the electronic switch circuit 44 comprises a transistor connected with at least one diode.

Figure 4:
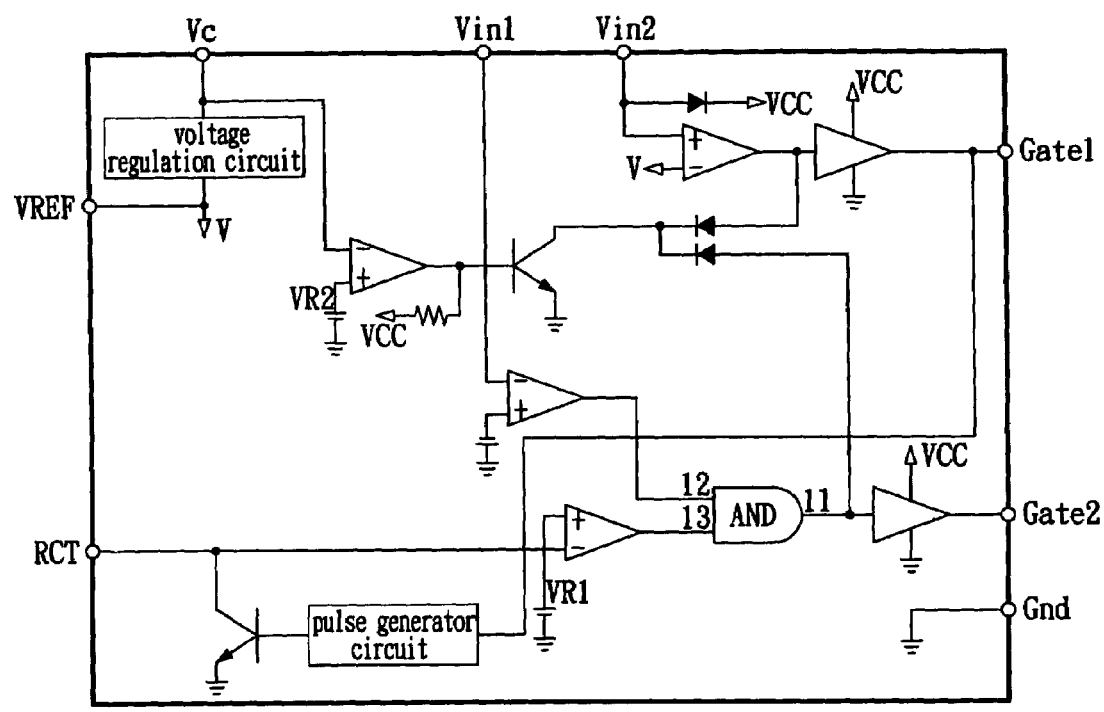
FIG. 4 depicts a schematic diagram of the synchronous rectification integrated circuit with dead time regulation according to the present invention.

Referring to FIG. 4, a schematic diagram of the synchronous rectification integrated circuit with dead time regulation according to the present invention is shown, with the first switch control circuit 1, the second switch control circuit 2, the dead time regulation circuit 3 and the low voltage protection circuit 4 packaged into a single control IC 5. As shown in FIG. 4, the control IC 5 is at least provided with a power pin Vc, a ground pin Gnd, a first input pin Vin1, a second input pin Vin2, a first output pin Gate1, a second output pin Gate2, a reference voltage pin VREF and a reference capacitor pin RCT.

Figure 5:
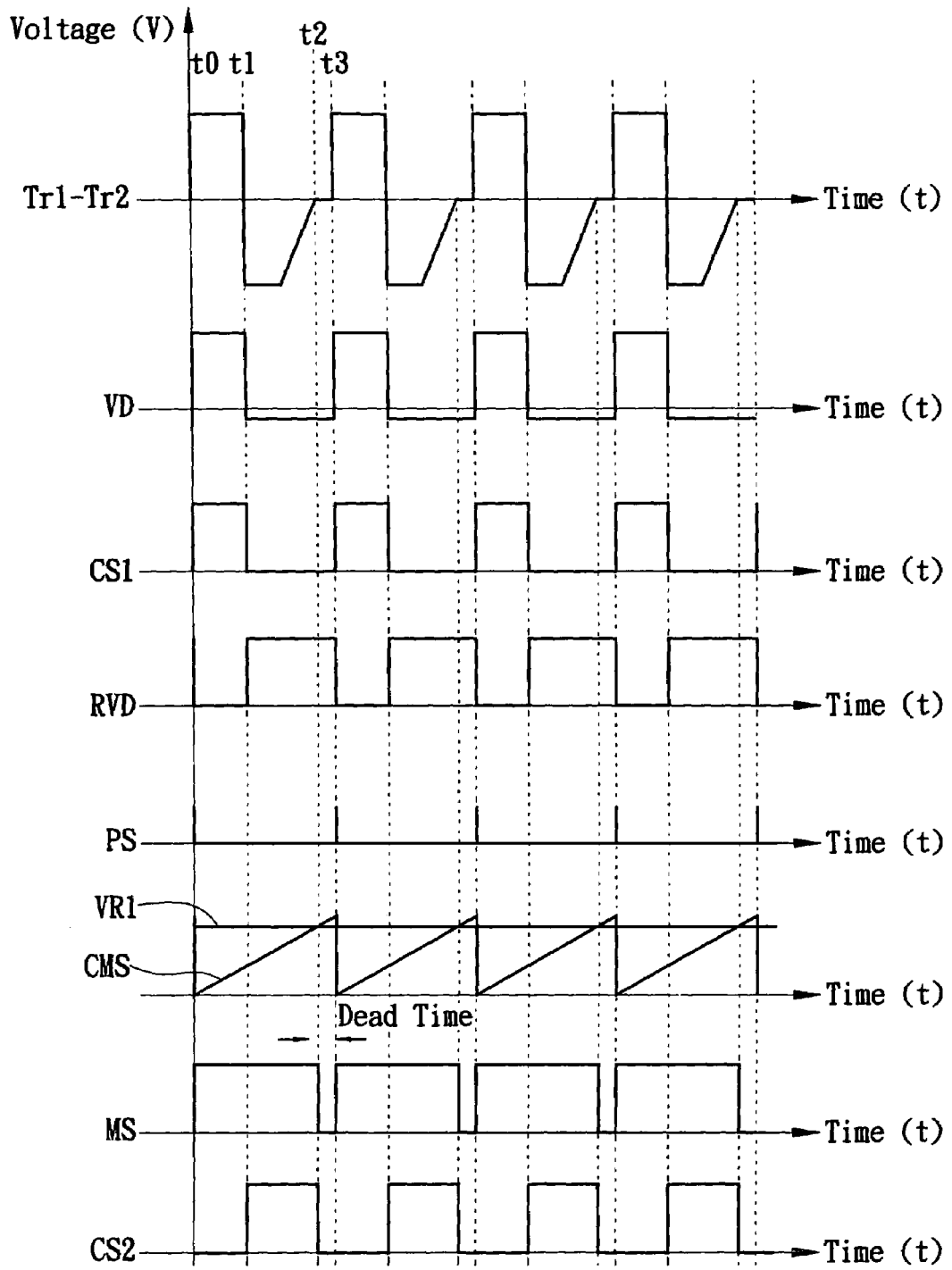
FIG. 5 schematically shows the waveforms used in the circuit of the forward power supply apparatus according to the present invention.

Referring to FIG. 3 and FIG. 5, the latter schematically shows the waveforms used in the circuit of the forward power supply apparatus according to the present invention. In the drawing, the horizontal axis represents a time axis t while the vertical axis represents a voltage axis v. During the time interval t0–t1, the voltage at the terminal Tr1 on the secondary side of the transformer Tr is HIGH and, at this time, the first switch control circuit 1 receives a HIGH input voltage VD and shapes the input voltage VD to control the first driver circuit 14 to produce a first control signal CS1, which is HIGH and thus causes the first switch SW1 to conduct.

At this time, the dead time regulation circuit 3 compares the dead time regulation comparison signal CMS with the first reference voltage level VR1 through the first comparator circuit 38. Since the first reference voltage level VR1 is higher than the voltage level of the dead time regulation comparison signal CMS during the time interval t0–t1, the first comparator circuit 38 outputs a logic HIGH dead time regulation signal MS, which is fed to the input terminal of the logic circuit 24 in the second switch control circuit 2.

Meanwhile, by using the inverter circuit 22, the second switch control circuit 2 inverts the HIGH input voltage VD to form a LOW inverted voltage RVD, which is output to the input terminal of the logic circuit 24. Then a logic AND operation is performed on the LOW inverted voltage RVD and the HIGH dead time regulation signal MS, generating a signal that controls the second driver circuit 26 to produce a LOW second control signal CS2, which drives the second switch SW2 into cutoff.

Referring again to FIG. 3 and FIG. 5, during the time interval t1–t2, the voltage at the terminal Tr1 on the secondary side of the transformer Tr is LOW, and, at this time, the first switch control circuit 1 receives a LOW input voltage VD and shapes the input voltage VD to control the first driver circuit 14 and produce a first control signal CS1, which is LOW and thus drives the first switch SW1 into cutoff.

At this time, the dead time regulation circuit 3 compares the dead time regulation comparison signal CMS with the first reference voltage level VR1 through the first comparator circuit 38. Since the first reference voltage level VR1 is higher than the voltage level of the dead time regulation comparison signal CMS during the time interval t1–t2, the first comparator circuit 38 outputs a logic HIGH dead time regulation signal MS, which is fed to the input terminal of the logic circuit 24 in the second switch control circuit 2.

Meanwhile, by using the inverter circuit 22, the second switch control circuit 2 inverts the LOW input voltage VD to form a HIGH inverted voltage RVD, which is output to the input terminal of the logic circuit 24. Then a logic AND operation is performed on the HIGH inverted voltage RVD and the HIGH dead time regulation signal MS, generating a signal that controls the second driver circuit 26 to produce a HIGH second control signal CS2, which causes the second switch SW2 to conduct.

Referring again to FIG. 3 and FIG. 5, during the time interval t2–t3, the voltage at the terminal Tr1 on the secondary side of the transformer Tr is LOW, and, at this time, the first switch control circuit 1 receives a LOW input voltage VD and shapes the input voltage VD to control the first driver circuit 14 and produce a first control signal CS1, which is LOW and thus drives the first switch SW1 into cutoff.

At this time, the dead time regulation circuit 3 compares the dead time regulation comparison signal CMS with the first reference voltage level VR1 through the first comparator circuit 38. Since the first reference voltage level VR1 is lower than the voltage level of the dead time regulation comparison signal CMS during the time interval t2–t3, the first comparator circuit 38 outputs a logic LOW dead time regulation signal MS, which is fed to the input terminal of the logic circuit 24 in the second switch control circuit 2.

Meanwhile, by using the inverter circuit 22, the second switch control circuit 2 inverts the LOW input voltage VD to form a HIGH inverted voltage RVD, which is output to the input terminal of the logic circuit 24. Then a logic AND operation is performed on the HIGH inverted voltage RVD and the LOW dead time regulation signal MS, generating a signal that controls the second driver circuit 26 to produce a LOW second control signal CS2, which drives the second switch SW2 into cutoff.

Moreover, at time t3, the pulse generator circuit 36 in the dead time regulation circuit 3 generates, based on the first control signal CS1, the pulse signal PS by waveform rising-edge triggering. Further, the charging circuit 34, which was being charged, is now discharged at time t3 by using the pulse signal PS. Next, during the time interval t3–t4, the waveform at each terminal in the synchronous rectification circuit with dead time regulation according to the present invention returns to the same shape as in the time interval t0–t1 described above.

In the above description, according to the synchronous rectification circuit with dead time regulation of the present invention, a charging time or slope of the charging circuit 34 may be controlled by adjusting the resistance of the resistor R and/or the capacitance of the capacitor C, and a dead time in which both the first switch SW1 and the second switch SW2 are cutoff; i.e., the time interval t2–t3, as shown in FIG. 5, may be provided by means of the comparison of the dead time regulation comparison signal CMS and the first reference voltage level VR1 through the first comparator circuit 38.

Therefore, in the synchronous rectification circuit with dead time regulation according to the present invention, the dead time of the switch circuit may be regulated so that the circuit loss due to the long dead time and the switching loss dues to the unstable dead time in the prior art are both minimized. Moreover, the switches are driven respectively by the first driver circuit and the second driver circuit, instead of directly by the voltage at the secondary side of the transformer, and thus the circuit may be applied when output voltage is high without adversely affecting the switches.

While the present invention has been described with reference to the detailed description and the drawings of the preferred embodiments thereof, it is to be understood that the invention should not be considered as limited thereby. Various modifications and changes could be conceived of by those skilled in the art without departing from the scope of the present invention, which is indicated by the appended claims.

What is claimed is:

1. A synchronous rectification circuit with dead time regulation connected to a secondary side of a transformer, an inductor, a first switch and a second switch for producing DC power, said circuit comprising:
   a first switch control circuit connected to one terminal on the secondary side of said transformer and to said first switch, said first switch control circuit including (a) a waveform shaping circuit connected to one terminal on the secondary side of said transformer, said waveform shaping circuit shaping an input voltage to output a first driving voltage, and (b) a first driver circuit connected to said waveform shaping circuit and to said first switch, said first driver circuit receiving said first driving voltage and producing a first control signal to control ON/OFF of said first switch;
   a dead time regulation circuit connected to said DC power and to said first driver circuit, said dead time regulation circuit receiving said first control signal and producing a dead time regulation signal; and
   a second switch control circuit connected to one terminal on the secondary side of said transformer, to said second switch and to said dead time regulation circuit, said second switch control circuit receiving said input voltage from the secondary side of said transformer and said dead time regulation signal to control ON/OFF of said second switch.

2. The synchronous rectification circuit with dead time regulation of claim 1, wherein said dead time regulation circuit comprises:

a pulse generator circuit connected to said first switch control circuit, said pulse generator circuit producing a pulse signal based on said first control signal output from said first switch control circuit;

a voltage regulation circuit connected to said DC power, said voltage regulation circuit producing charging power;

a charging circuit connected to said pulse generator circuit and to said voltage regulation circuit, said charging circuit performing a charge/discharge operation based on said charging power and said pulse signal to produce a dead time regulation comparison signal; and a first comparator circuit connected to a first reference voltage level, to said charging circuit, to said pulse generator circuit and to said second switch control circuit, said first comparator circuit comparing said first reference voltage level with said dead time regulation comparison signal to produce said dead time regulation signal.

3. The synchronous rectification circuit with dead time regulation of claim 2, wherein said dead time regulation comparison signal is a sawtooth wave signal.

4. The synchronous rectification circuit with dead time regulation of claim 2, wherein said charging circuit is an RC charging circuit.

5. The synchronous rectification circuit with dead time regulation of claim 1, wherein said second switch control circuit comprises:

an inverter circuit connected to one terminal on the secondary side of said transformer, said inverter circuit inverting said input voltage to output an inverted voltage;

a logic circuit connected to said inverter circuit and to said dead time regulation circuit, said logic circuit performing a logic AND operation on said inverted voltage and said dead time regulation signal to produce a second driving voltage; and a second driver circuit connected to said logic circuit and to said second switch, said second driver circuit receiving said second driving voltage and producing a second control signal to control ON/OFF of said second switch.

6. The synchronous rectification circuit with dead time regulation of claim 1, further comprising a low voltage protection circuit connected to said DC power, to said first switch control circuit and to said second switch control circuit, said low voltage protection circuit receiving said input voltage and controlling operation of said first switch control circuit and said second switch control circuit.

7. The synchronous rectification circuit with dead time regulation of claim 6, wherein said low voltage protection circuit comprises:

a second comparator circuit connected to said DC power, said second comparator circuit comparing said DC power with a second reference voltage level to produce a protection control signal;

an electronic switch circuit connected to said second comparator circuit, to said first switch control circuit and to said second switch control circuit, said electronic switch circuit receiving said protection control signal and being controlled to ground output voltages of said first switch control circuit and said second switch control circuit.

8. The synchronous rectification circuit with dead time regulation of claim 7, wherein said electronic switch circuit comprises a transistor connected with at least one diode.

9. The synchronous rectification circuit with dead time regulation of claim 6, wherein said first switch control circuit, said second switch control circuit, said dead time regulation circuit and said low voltage protection circuit are packaged as a control IC having at least a power terminal (Vc), a ground terminal (Gnd), a first input terminal (Vin1), a second input terminal (Vin2), a first output terminal (Gate1), a second output terminal (Gate2), a reference voltage terminal (VREF) and a reference capacitor terminal (RCT).

* * * * *